April 25, 1961
E. H. WILLETTS ET AL
2,981,283
AUTOMATIC DUMP DRAIN VALVE
Original Filed Nov. 2, 1954
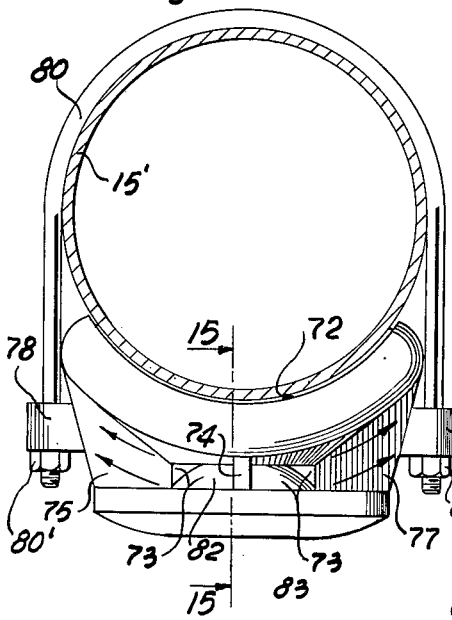
Fig. 1.
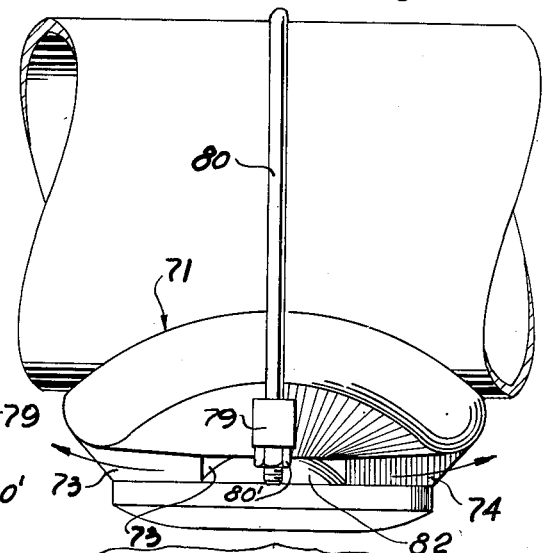
Fig. 2.
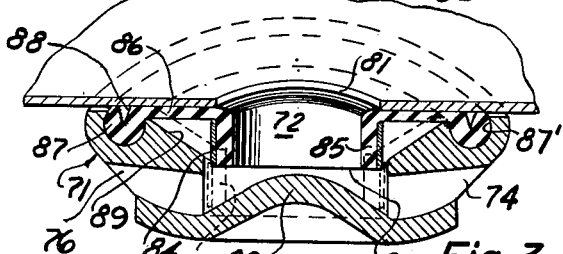
Fig. 3.
Fig. 4.
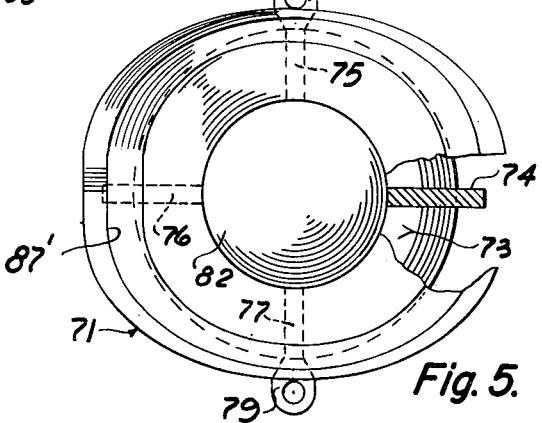
Fig. 5.
INVENTOR.
ELWOOD H. WILLETTS
CARL B. INGRAM &
BY LOUIS E. WATSON
L. S. Saulsbury
ATTORNEY

United States Patent Office 2,981,283
Patented Apr. 25, 1961

2,981,283

AUTOMATIC DUMP DRAIN VALVE

Elwood H. Willetts, 320 Kenmore Road, Douglaston, N.Y., and Carl B. Ingram, El Monte, and Luke E. Watson, San Gabriel, Calif.; said Ingram and said Watson assignors to said Willetts Original application Nov. 2, 1954, Ser. No. 466,412, now Patent No. 2,889,993, dated June 9, 1959. Divided and this application Apr. 8, 1957, Ser. No. 652,079

1 Claim. (Cl. 137—517)

This invention relates to an automatic pipe line dump drain valve. This application is a divisional application of the co-pending application, Serial No. 466,412, filed November 2, 1954, now Patent No. 2,889,993.

It is the principal object of the present invention to provide an automatic valve adapted to be located in a suspended pipe line such as a mobile irrigator or sprinkler which will automatically dump the water in the pipe line when the pressure has been withdrawn.

It is another object of the invention to provide an automatic dump drain valve that can be located on the pipe line of an automatic irrigator or sprinkler that is normally opened but automatically closes upon renewal of water pressure so that the sprinkler or irrigator will automatically be relieved of its water when the pressure is turned off and the irrigator or spinkler is to be drawn to a new location.

It is still another object of the invention to provide an automatic dump drain valve which is adapted to be externally fitted to a pipe line so that it does not interfere with the normal flow of water therethrough.

It is a further object of the invention to provide an automatic dump valve for mobile irrigators or sprinklers wherein the pipe is bowed under the water weight therein and wherein the sand or dirt sediment collected at its midway point will be drained through the dump valve and sand and dirt sediment will be automatically eliminated from the pipe line each time the dump valve is opened and the water released therefrom.

Other objects of the invention are to provide an automatic dump valve for mobile irrigators or sprinklers, which is of simple construction, has a minimum number of parts, inexpensive to manufacture, easy to assemble upon the pipe line, durable, has long life, compact and efficient and effective in use, and automatic in operation.

For a better understanding of the invention, reference may be had to the following detail description taken in connection with the accompanying drawing, in which Fig. 1 is an end elevational view of a modified form of an external automatic drain valve connected to a pipe section, Fig. 2 is a side elevational view of the drain valve, shown in Fig. 1, Fig. 3 is a longitudinal sectional view of the valve and pipe taken on line 15—15 of Fig. 1, Fig. 4 is a top plan view of the flexible valve element of this latter form of the valve, and Fig. 5 is a top plan view of the valve body, the flexible valve element having been removed and portions of the body having been broken away to show the construction of one area.

The water is supplied under pressure to either end of a sprinkler pipe line section 15' which under load, has its intermediate portion bowed under the weight of the water so that sediment in the water will collect in the pipes midway the length thereof. It has accordingly been found that the dump valves for each of the pipes should be located at these intermediate portions of the pipes and midway of the carriages. Accordingly, an external automatic pressure responsive dump valve is connected to each of the pipes at such location to effect draining automatically of the pipe line upon release of water pressure and to automatically close the drain opening upon re-establishing pressure in the pipe line.

When the sprinkler is to be transported over the field, the added load of the water is too great for the soft ground and accordingly it is well that this water be discharged before moving the sprinkler. It will be seen that this is done automatically with this present arrangement and at the same time the pipes will be cleared of any sediment which may have accumulated. By having the valve located externally upon the pipe, unnecessary turbulence and restriction of the flow of water in the pipe line is avoided.

Referring now to Figs. 1 to 5, there is shown the external dump valve which can be conveniently used. This dump valve includes a valve body 71 in which a flexible annular valve element 72 is disposed. The valve body 71 has four openings 73 that are separated by four ribs 74, 75, 76 and 77 supporting an integral valve seat 82. The ribs 75 and 76 respectively have bosses 78 and 79 for receiving a U-shaped clamping bolt 80 that fixes the valve assembly to the bottom of a pipe when nuts 80' are tightened against the bosses. The pipe has a large hole 81 through which water may leave the pipe and with which the valve parts are aligned. The valve body 71 has an upwardly raised conical valve seat portion 82 against which lower end face 83 of sleeve portion 85 of the valve element 72 will engage when forced to the dotted line position 72', shown in Fig. 3. A retaining ring 84 surrounds the sleeve portion 85 to stiffen it and prevent its collapse. The valve element 72 has a top flange 86 with a bead 87 depending from its outer periphery that enters an annular groove 87' in the body 71. An annular V-shaped slot 88 is cut in the upper surface of the flange and into said bead to provide good sealing engagement and grip of the valve element 72 with the undersurface of the pipe 15. Since the hole 81 in the pipe is larger than the opening provided by the sleeve portion 85, the water pressure will engage the flange 86 and lower the sleeve portion 85 onto the seat 82 and the flange 86 toward a conical surface 89. Release of the water pressure allows the flexible valve element to assume its original position and water to drain from the pipe line and any sediment that may have collected in the weighted intermediate portion of the pipe.

While various changes may be made in the detail construction, it shall be understood that such changes shall be within the spirit and scope of the present invention as defined by the appended claim.

What is claimed is:

In combination, a cylindrical shaped pipe having a bottom drain hole intermediate its length and an outer semi-cylindrical surface surrounding the drain hole, a valve body having a top cylinder surface corresponding to the cylindrical surface of the pipe to receive the pipe surface, said valve body having a central opening lying beneath the pipe drain hole with a top conical surface extending thereabout, said valve body further having drain openings extending radially from the central opening and beneath the conical surface, a flexible returnable rubber element having a central opening of less diameter than the bottom drain hole of the cylindrical pipe and concentrically underlying the bottom drain hole while overlying the conical surface of the valve body, means securing the valve body and the rubber valve element to the pipe in tight flush sealing engagement with the outer semi-cylindrical surface of the pipe and about the drain hole, said flexible returnable rubber valve element having a central sleeve portion depending through the central opening of the valve body to close the radially-extending drain opening of the valve body when depressed, said valve body having a centrally located seat surface against which the lower end of the depending sleeve portion engages upon the valve element being deflexed under the pressure of liquid within the pipe, said valve body having a groove immediately surrounding the outer periphery of the conical surface and said rubber valve element having a depending bead fitted in the groove of the valve body whereby the rubber valve element will be held against radially inward collapse.

References Cited in the file of this patent

UNITED STATES PATENTS

| | | |
|---|---|---|
| 1,872,792 | Neorr | Aug. 23, 1932 |
| 2,006,196 | Crowley | June 25, 1935 |
| 2,593,103 | Casler | Apr. 15, 1952 |
| 2,615,675 | Mellert | Oct. 28, 1952 |
| 2,646,059 | Wittner et al. | July 21, 1953 |
| 2,732,859 | Chace | Jan. 31, 1956 |
| 2,758,609 | Dickert | Aug. 14, 1956 |
| 2,768,639 | Stilwell | Oct. 30, 1956 |
| 2,775,979 | Stout et al. | Jan. 1, 1957 |
| 2,730,115 | Hempel | Jan. 10, 1957 |